United States Patent [19]

Fritzsche

[11] Patent Number: 4,654,552
[45] Date of Patent: Mar. 31, 1987

[54] LANCED STRIP AND EDGEWISE WOUND CORE

[75] Inventor: Harold L. Fritzsche, Fort Wayne, Ind.

[73] Assignee: General Electric Company, Fort Wayne, Ind.

[21] Appl. No.: 717,037

[22] Filed: Mar. 28, 1985

[51] Int. Cl.⁴ .............................................. H02K 1/00
[52] U.S. Cl. ...................................... 310/216; 310/42; 310/259
[58] Field of Search ................. 310/42, 254, 259, 216, 310/217, 264, 178, 180, 218, 179, 187, 265; 29/596, 605; 336/211-213, 216-219, 233, 234

[56] References Cited

U.S. PATENT DOCUMENTS

| | | | |
|---|---|---|---|
| 1,822,096 | 9/1931 | Hollander | 310/217 |
| 2,908,965 | 10/1959 | Platt | 29/155.5 |
| 3,320,451 | 5/1967 | Wiley | 310/259 |
| 4,403,401 | 9/1983 | Rosenberry | 310/216 |

FOREIGN PATENT DOCUMENTS

| | | | |
|---|---|---|---|
| 0017311 | 10/1980 | European Pat. Off. | 310/217 |
| 0372205 | 4/1921 | Fed. Rep. of Germany | 310/217 |
| 1037902 | 8/1966 | United Kingdom | 310/216 |

Primary Examiner—R. Skudy
Attorney, Agent, or Firm—Ralph E. Krisher, Jr.

[57] ABSTRACT

A lanced strip of generally thin ferromagnetic material adapted to be edgewise wound into a core for a dynamoelectric machine. The lanced strip has a yoke section extending generally lengthwise thereof, and a plurality of teeth on the lanced strip are disposed about a plurality of preselected pitch axes and extend generally laterally from the yoke section, respectively. A plurality of slits in the yoke section extend generally lengthwise thereof and span between a preselected number of the teeth, respectively. An edgewise wound core is also disclosed.

30 Claims, 14 Drawing Figures

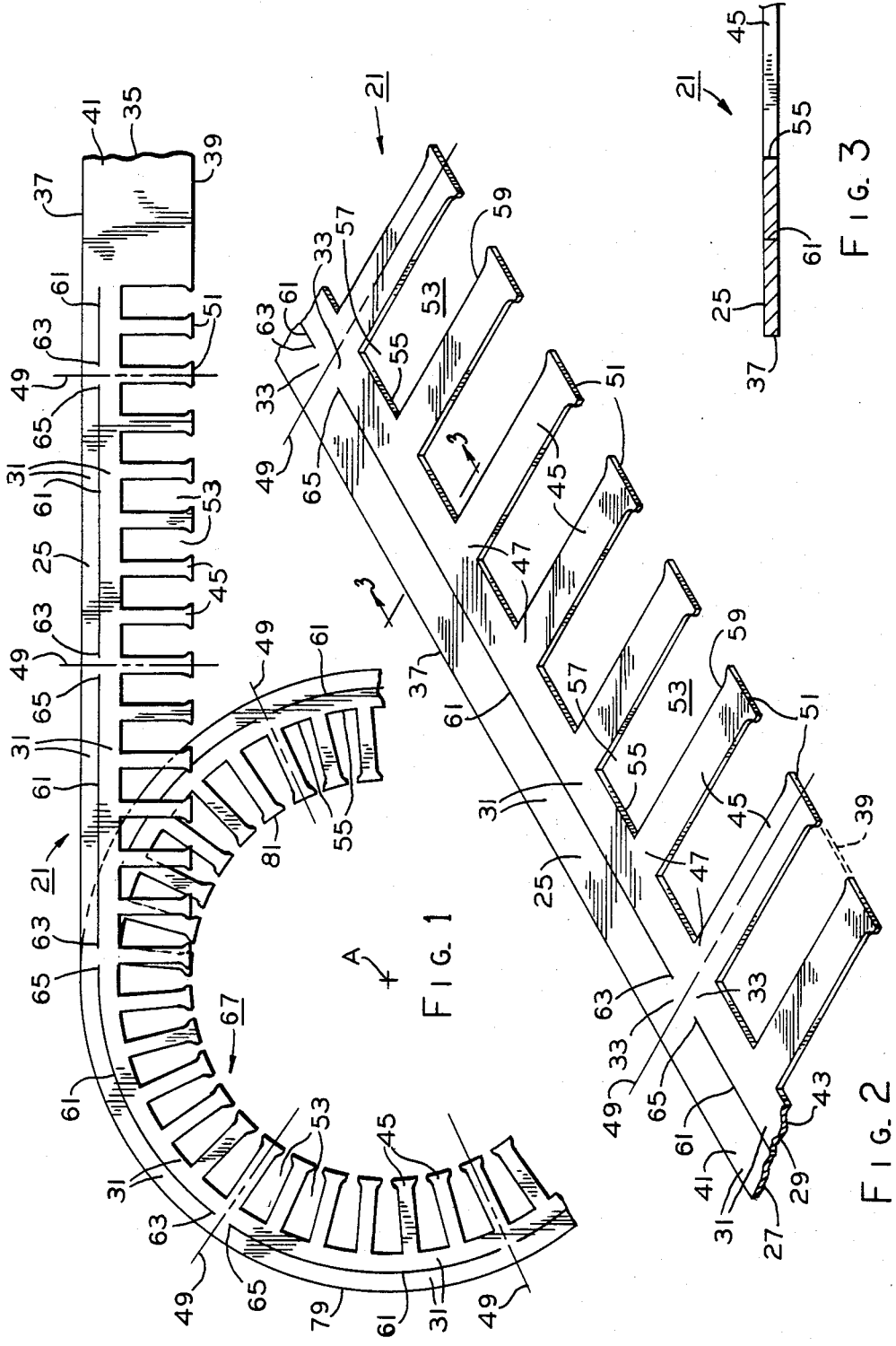

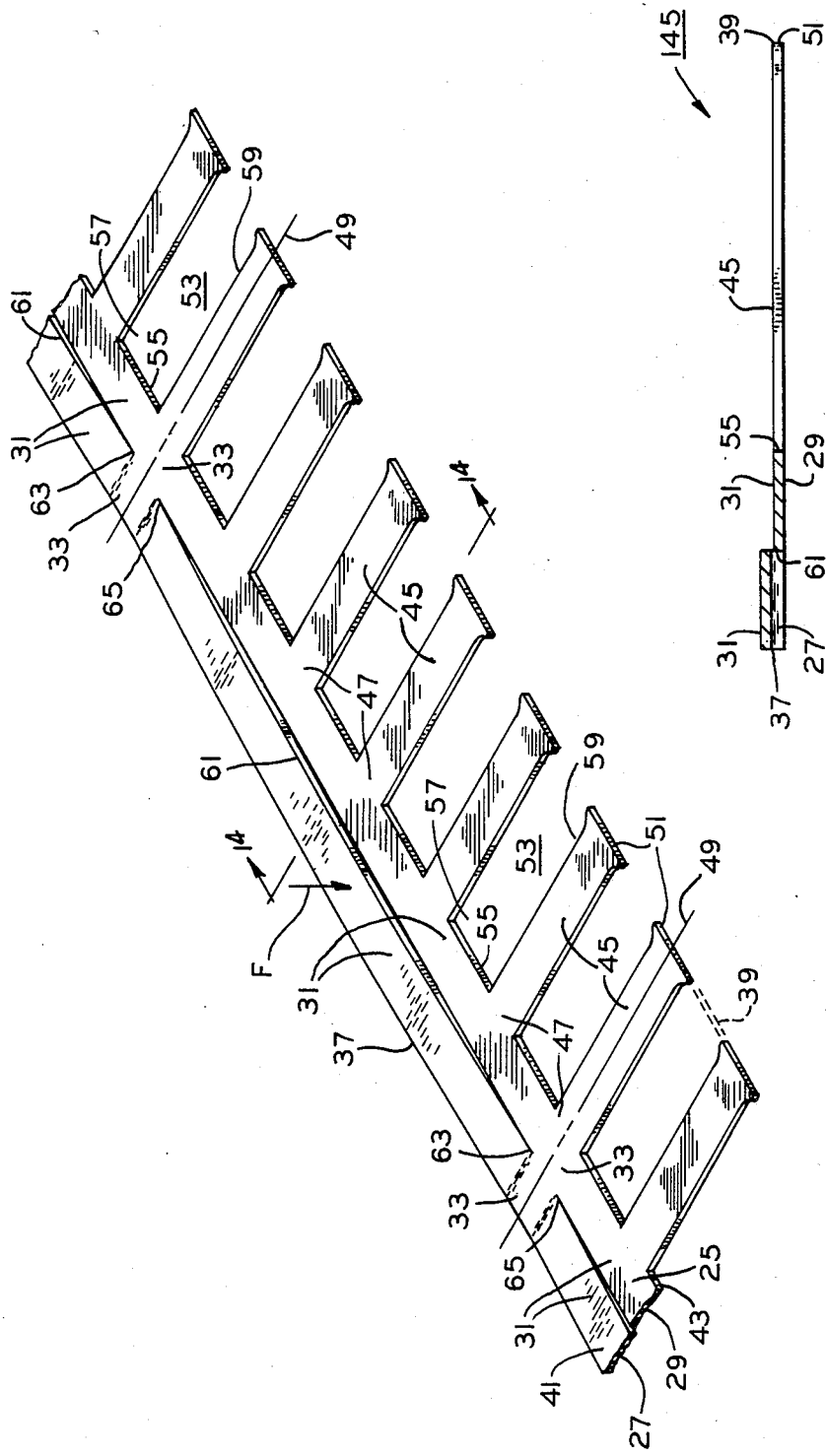

LANCED STRIP AND EDGEWISE WOUND CORE

CROSS-REFERENCE TO RELATED APPLICATIONS

This application is related to the following listed commonly assigned applications, each of which is incorporated herein by reference: Ser. No. 660,211 filed Oct. 12, 1984; Ser. No. 660,116 filed Oct. 12, 1984; Ser. No. 660,101 filed Oct 12, 1984; and Ser. No. 680,762 filed Dec. 12, 1984.

FIELD OF THE INVENTION

This invention relates in general to dynamoelectric machines, and in particular to an edgewise wound core for use in a dynamoelectric machine and a lanced strip of generally thin metallic material adapted for edgewise winding into such core.

BACKGROUND OF THE INVENTION

In the past, various different apparatus and methods have been utilized to effect the edgewise winding of lanced strips of generally thin ferromagnetic material into edgewise wound cores or stators for a dynamoelectric or electric motor. Of course, the aforementioned lanced strips were provided with a pair of opposite edges extending generally lengthwise thereof, and a yoke section was formed along one of the opposite edges with a plurality of spaced apart teeth extending generally laterally from the yoke section toward the other of the opposite edges of the strip. These lanced strips were edgewise wound into a plurality of helical convolutions thereof, and such helical convolutions were accumulated in a generally annular stack having a preselected stack height thereby to define the aforementioned edgewise wound core. Of course, when the helical convolutions of the lanced strips were accumulated in the annular stack thereof, the yoke section of the lanced strip extended generally circumferentially about the annular stack, and the teeth extended generally radially inwardly from the yoke section in a plurality of row formations thereof across the annular stack with tips of the teeth defining in part a bore through the annular stack.

Some of the aforementioned past edgewise winding techniques were, of course, successful; however, it is believed that such success was limited to lanced strips in which the width of the yoke section was relatively small or narrow. In other words, during the edgewise winding of lanced strips into the helical convolutions thereof, the yoke section was rather highly stressed, both in tensile and compression, and thereby tended to deflect or buckle in a direction generally perpendicular to the plane of the yoke section, and it is believed that one of the disadvantageous or undesirable features which occurred during the past edgewise winding of the lanced strip was the aforementioned buckling of the yoke section in response to the tensile and compressive stresses imparted thereto. Thus, it is believed that the aforementioned buckling of the yoke section in response to the stresses imparted thereto under the past edgewise winding technique were accentuated or increased when yoke sections of relatively greater widths were employed inthe lance strip so as to obviate successful edgewise winding thereof. In an effort to overcome this buckling problem, particularly with respect to lanced strips having the aforementioned relatively wider yoke sections, opposed side plates were urged into engagement with the opposite faces of the lanced strip during the edgewise winding thereof, but it is believed that such use of the side plates has not been entirely satisfactory to solve the aforementioned buckling problem.

SUMMARY OF THE INVENTION

Among the several objects of the present invention may be noted the provision of an improved edgewise wound core and an improved lanced strip of generally thin metallic material adapted to be wound into such core which overcome the above discussed disadvantageous or undesirable features, as well as others, of the prior art; the provision of such improved strip and core in which a plurality of segments are provided in a yoke section of the strip with each segment being free of adjacent segments at a plurality of reaches along the length of such strip; the provision of such improved strip and core wherein the reaches of the adjacent segments are defined bya plurality of slits between the adjacent segments in the yoke section and extending generally along the length thereof; the provision of such improved strip and core in which such segments are joined together at a plurality of junctures between the reaches of such segements along the length of such strip; the provision of such improved strip and core in which such segments are edgewise deformed independently of adjacent segments at each of the reaches thereof along the length of such strip upon the edgewise deformation thereof; the provision of such improved strip and core in which the segments are supported at the junctures between the reaches along the length of the stip during the edgewise deformation of the segments and such strip; the provision of such improved strip and core in which the stresses established upon the edgewise deformation of the segments are absorbed in the junctures supporting the segments; the provision of such improved strip and in which the reaches of the segments of at least one set thereof are increased by displacing them from the plane of the strip; and provision of such improves strip and core wherein the energy required to edgewise deform such strip is the sum of that requred to edgewise deform each of the segments and wherein deflection of such strip resulting from the edgewise deformation thereof is that maximum deflection exhibited by any one of such segments upon the edgewise deformation of such segments and the provision of such improved strip and core in which the slits and junctures in the yoke section permit the use of a relatively wider yoke section. These as well as other objects and a advantageous features of the present invention will be in part apparent and in part pointed out hereinafter. ·

In general and in one form of the invention, a lanced strip of generally thin ferromagnetic material adapted to be edgewise wound into a core for a dynamoelectric machine is provided with a yoke section arranged generally lengthwise of the lanced strip. The yoke section includes a plurality of sets of segments with adjacent segments in the same segment set extending generally lengthwise of the lanced strip, and each of the segments is free of an adjacent segment in an adjacent segment set at each of a plurality of reaches of the segments along the length of the lanced strip. Further, each segment is joined to an adjacent segment in the adjacent segment set at a plurality of junctures between the reaches along the length of the lanced strip, respectively.

Further in general, an edgewise wound core in one form of the invention has a lanced strip of generally thin ferromagnetic material edgewise and helically wound into a generally annular stack thereof defining the core. A plurality of sets of generally edgewise deformed segments is provided in the wound lanced strip, and the edgewise deformed segments in the same segment sets extend generally in a plurality of row formations thereof across the core. Each of the edgewise deformed segments is free of an adjacent segment in an adjacent segment set at each of a plurality of reaches of the edgewise deformed segments along the edgewise wound strip, and each edgewise deformed segment is joined to an adjacent edgewise deformed segment in the adjacent segment set at a plurality of junctures generally between the reaches, respectively.

BRIEF DESCRIPTION OF THE DRAWINGS

FIG. 1 is a plan view showing a lanced strip of generally thin ferromagnetic material in one form of the invention and illustrating principles which may be practiced in a method of forming an edgewise wound core from such lanced strip;

FIG. 2 is an enlarged partial perspective view of the lanced strip of FIG. 1;

FIG. 3 is an enlarged sectional view taken along line 3—3 in FIG. 2;

FIG. 13 is a partial perspective view of still another alternative lanced strip in one form of the invention adapted to be edgewise wound into a core; and FIG. 14 is an enlarged partial sectional view taken along line 14—14 in FIG. 13.

Figure 4:
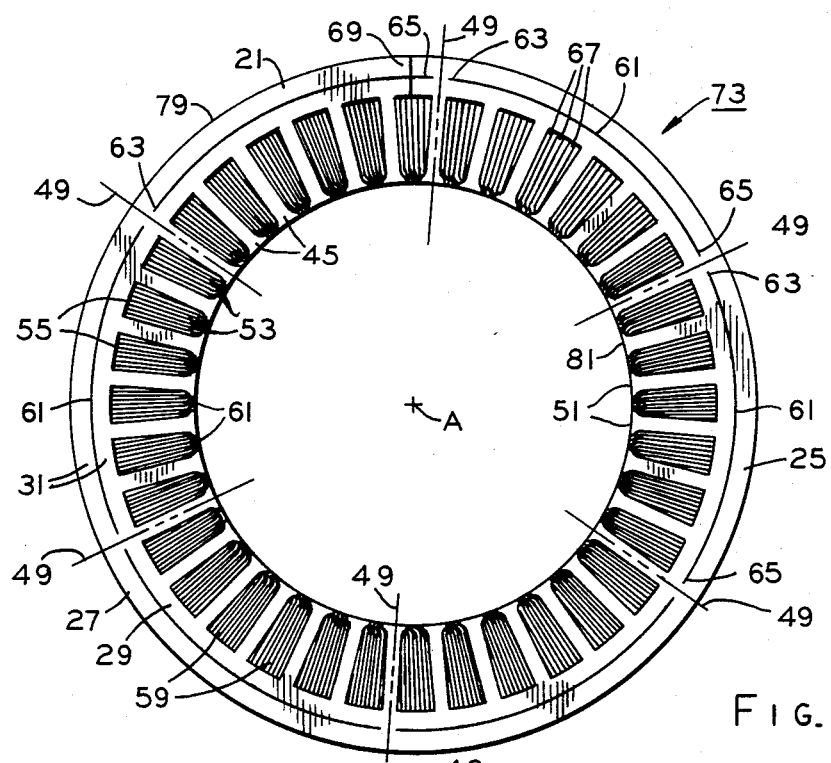
FIG. 4 is an end elevational view of the edgewise wound core of FIG. 1 in an as wound state thereof with a plurality of teeth a plurality of winding receiving slot between the teeth and a yoke section of adjacent helical convolutions of the lanced strip angularly displaced.

The exemplifications set out herein illustrate the preferred embodiments of the invention in one form thereof, and such exemplifications are not to be construed in any manner as limiting either the scope of the disclosure or the scope of the invention.

DETAILED DESCRIPTION OF THE PREFERRED EMBODIMENTS

With reference now to the drawings in general, there is shown in one form of the invention a strip or lanced strip 21 of generally thin metallic material, such as a ferromagnetic material or the like for instance, which is adapted to be edgewise and helically or spirally wound into a core 23 for use in a dynamoelectric machine (not shown) or the like (FIGS. 1-3 and 5). Strip 21 has a yoke section 25 extending generally lengthwise thereof, and a plurality of sets 27, 29 of separate segments 31 in the yoke section extend generally lengthwise of the strip, respectively (FIGS. 2 and 3). A plurality of junctures or junction means 33 are provided in yoke section 25 for integral interconnection between adjacent segments 31 in the same segment sets 27, 29, and each of the junctures or junction means in the same segment set is integrally interconnected with an adjacent juncture means in an adjacent segment set, respectively (FIG. 2).

More particularly and with specific reference to FIGS. 1-3, strip 21 may be lanced or otherwise formed from a strip stock 35 of the ferromagnetic material by suitable means well known to the art, such as a progressive die set or the like for instance (not shown), and the strip stock has, of course, the desired electrical characteristics and the desired physical properties to enhance the edgewise winding of strip 21 into core 23, as discussed in detail hereinafter. If a more detailed discussion is desired with respect to the lancing of strip stock 35 and/or a multiple die set to effect such lancing, reference may be had to the aforementioned Harold L. Fritzsche application Ser. No. 660,211. A pair of opposite outer edges 37, 39 are interposed between a pair of opposite generally flat surfaces or faces 41, 43 on strip stock 35 so as to extend generally along the length thereof, and when the strip stock is formed or lanced into strip 21, yoke section 25 extends generally lengthwise thereof along or at least adjacent outer edge 37 of the strip. A plurality of teeth 45 on strip 21 are provided with a plurality of root portions or sections 47 integrally formed with a yoek section 25, and the teeth extend on a plurality of preselected pitch axes 49 therefor generally laterally from the yoke section toward outer edge 39 of the strip. A plurality of tips or tip sections 51 are provided on the free ends of teeth 45 at least adjacent outer edge 39 of strip 21. While strip 21, its yoke section 25 and teeth 45 are illustrated herein for purposes of disclosure, it is contemplated that other strips, yoke sections and teeth of various different configurations may be utilized within the scope of the invention so as to meet at least some of the objects thereof.

A plurality of slots 53 are provided through strip 21 at least in part between adjacent one of teeth 45, and a plurality of generally flat or straight inner edges 55 on the strip are arranged in generally parallel and opposite facing relation with outer edge 37 thereof so as to interconnect between root portions 47 of adjacent ones of teeth 45, respectively. Thus, inner edges 55 generally define the configurations of a plurality of closed ends 57 of slots 53 disposed adjacent yoke section 25 of strip 21, and since inner edges 55 are generally flat, as previously mentioned, the slots referred to as flat bottomed slots, as well known in the art. Although outer and inner edges 37, 55 are illustrated as being flat or straight for purpose of disclosure, it is contemplated that such edges, may have other configurations within the scope of the invention so as to meet at least some of the objects thereof. A plurality of open ends 59 of slots 53 intersect with outer edge 39 of strip 21 between adjacent ones of tooth tips 51 thereby to intersect outer edge 39, and the open ends of the slots are arranged generally opposite closed ends 57 thereof, respectively.

A plurality of spaced apart slits 61 are lanced or otherwise formed through yoke section 25 of strip 21 so as to extend generally lengthwise thereof, and the slits are provided between adjacent segments 31 of adjacent segment sets 27, 29 thereby to separate such adjacent segments from each other. Thus, slits 61 extend generally in an interrupted row formation thereof lengthwise of yoke section 25, and segments 31 in segment set 27 are defined generally between the slits and outer edge 37 of strip 21 while segments 31 in segment set 29 are defined generally between the slits and both inner edges 55 of slots 53 and root portions 47 of teeth 45. Each slit 61 has a pair of opposite ends or end portions 63, 65, which define the length thereof as well as the reaches or lengths of segments 31 generally along the length of strip 21. It may be noted that the configurations of slits 61, illustrated as straight line slits, generally conform to the generally straight or flat outer and inner edge 37, 55 on strip 21, and segments 31 in segment sets 27, 29 are also generally of the same configuration; however, even though such segments are illustrated herein as having generally the same configuration for purposes of disclosure, it is contemplated that the width of such segments across yoke section 25 may be either generally equal or may vary from each other within the scope of the invention so as to meet at least some of the objects thereof. It may also be noted that adjacent segments 31 in segment sets 27, 29 are free, detached or otherwise separate from each other along the lengths of slits 61 between opposite ends 63, 65 thereof so that such segments may be edgewise deformed or bent independently of each other upon the edgewise deformation of strip 21 when it is wound into core 23, as discussed in detail hereinafter. Additionally, it may also be noted that the lengths or reaches of segments 31 and slits 61 between opposite ends 63, 65 thereof span generally across a preselected number of slots 53, six slots as best seen in FIG. 2, and also that adjacent opposed ones of the opposite ends of the slits are predeterminately arranged in spaced apart relation from preselected ones of pitch axes 49 of teeth 45 wherein the segments and slits span generally between a preselected number of the teeth, seven teeth as best seen in FIG. 2.

Junctures 33, as defined in yoke section 25, are integrally interconnected between adjacent segments 31 in the same segment sets 27, 29 generally at the ends or reaches of such adjacent segments thereby to span across the aforementioned preselected ones of pitch axes 49 of teeth 45, and each juncture is joined or integrally interconnected with an adjacent juncture in an adjacent segment set generally at or between the adjacent opposed ones of opposite ends 63, 65 of slits 61, respectively. Thus, it may be noted that junctures 33 are provided in interconnected relation in segment sets 27, 29 to support segments 31 thereof, and it may be further noted that the junctures are predeterminately arranged in spanning relation across the aforementioned preselected ones of pitch axes 49 of teeth 45 so as to be disposed at the thickest cross-sectional or width dimension of strip 21 between opposite edges 37, 39 thereof, respectively.

With reference again to the drawings in general and recapitulating at least in part with respect to the foregoing, there is shown a method for forming edgewise wound core 23 from strip 21 with the strip including opposite edges 37, 39 thereof (FIGS. 1–6). To practice this method, strip 21 is lanced or otherwise formed into sets 27, 29 of segments 31 with each segment in the same segment set being spaced apart generally lengthwise of the strip and with adjacent segments in adjacent segment sets being separated from each other, and junctures 33 are integrally provided between the adjacent segments in the same segment sets with each juncture being integrally joined with an adjacent juncture in the adjacent segment sets, respectively (FIGS. 2 and 3). Strip 21 is deformed generally edgewise thereof, i.e., about its opposite edges 37, 39 and generally flatwise with respect to its opposite surfaces 41, 43, and generally conjointly with the edgewise deformation of strip 21, segments 31 are also generally edgewise deformed or otherwise bent independently of each other between junctures 33 in the strip, respectively (FIGS. 1 and 4–6).

More particularly and with specific reference to FIGS. 1–6, strip stock 35 may be advanced or fed from a supply thereof through suitable means, such as the aforementioned progressive die set, operable generally for lancing strip 21 from the strip stock with the strip having the same component parts as discussed in detail hereinabove; however, for the sake of brevity, such strip stock supply and progressive die set are not shown herein. Upon the lancing of strip 21 froms trip stock 35, slits 61 are lanced into yoke section 25 of the strip with the slits extending generally lengthwise thereof in spanning relation across a preselected number of slots 53 and also intersecting with opposite surfaces 41, 43 of the strip, and the adjacent opposed ones of opposite ends 63, 65 of the slits are arranged in predetermined spaced apart relation from the aforementioned preselected ones of pitch axes 49 of teeth 45, respectively, as best seen in FIG. 2. Thus, in response to the establishment of slits 61 in strip 21, sets 27, 29 of segments 31 are defined or otherwise formed in yoke section 25 with the slits extending between the adjacent segments in the adjacent segment sets thereby to separate such adjacent segments along the reaches thereof lengthwise of the strip, respectively. Furthermore, in response to the provision of slits 61 in strip 21, junctures 33 are likewise defined or located in yoke section 25 in spanning relation across the preselected ones of pitch axes 49 of teeth 45 thereby to integrally interconnect or join between adjacent segments 31 in the same segment sets 27, 29, and the junctures are also integrally joined or interconnected with adjacent junctures in the adjacent segment sets generally at or between the adjacent opposed ones of opposite ends 63, 65 of the slits, respectively. Although it is contemplated that a plurality of strips 21 may be conjointly lanced from a strip stock of the ferromagnetic material, only one such strip is illustrated herein as being lanced from such strip stock for the sake of brevity of disclosure.

Figure 6:
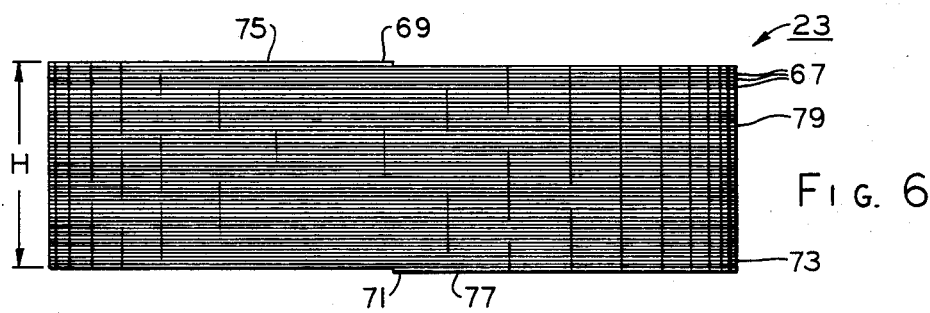
FIG. 6 is a side elevational view of the edgewise wound core of FIG. 5.

Subsequent to the formation of slits 61 in strip 21, as discussed above, the strip is formed, deformed, bent or otherwise wound generally edgewise (flatwise) thereof, and in response to such edgewise deformation of the strip, a plurality of generally helical or spiral convolutions 67 are formed having an axis A, as best seen in FIG. 1. This edgewise deformation of strip 21 into helical convolutions 67 thereof may be either continuous or intermittent with the deformed strip having severed leading and trailing end portions or ends 69, 71 defining the length thereof necessary to establish a preselected stack height H of the helical convolutions upon the accumulation thereof into a generally annular stack 73 which defines respective ones of core 23, as discussed in greater detail hereinafter and as illustrated in FIG. 6. Generally conjointly with the edgewise deformation of strip 21, segments 31 are also generally edgewise deformed or bent independently of each other at the reaches thereof along yoke section 25 and generally about junctures 33 in segment sets 27, 29, respectively.

Generally, as a result of the mutual freedom between adjacent segments 31 in adjacent segment sets 27, 29, which enables sliding and stretching or extension action of such adjacent segments relative to each other, the independent deformation of such adjacent segments relative to each other and generally in coplanar relation with each other is enabled, and each of junctures 33 not only supports the segments during the edgewise deformation thereof but also support each other. Thus, in the supporting relation of junctures 33 with segments 31, it may be noted that stresses established in response to the independent edgewise deformation of the segments are transferred to the junctures or otherwise absorbed by the junctures; therefore, the strength of the junctures must be great enough so as not to rupture or buckle in response to the establishment of such stresses. It is believed that the total energy required to effect the edgewise deformation of strip 21 having sets 27, 29 of segments 31 therein, as discussed above, is appreciably less than that energy which would be required to effect the edgewise deformation of a similar strip without such sets of segments. It is also believed that the tendency of segments 31 to deflect or buckle (i.e., from the plane of the strip) upon the edgewise deformation thereof is less than the deflection or buckling tendencies of a similar strip without such segments. Further it may be noted that adjacent segments 31 in adjacent segment sets 27, 29 are edgewise deformed independently of each other since the stress established upon such edgewise deformation cannot be transferred between such segments at slits 61 therebetween but, instead, such established stress is transferred to junctures 33 in their supporting relation with the segments. Of course, upon the edgewise deformation of strip 21, as discussed above, teeth 45 are positioned or repositioned about their pitch axes 49 so as to extend generally radially inwardly from the edgewise deformed yoke section 25 of the edgewise deformed strip 21, respectively.

Figure 5:
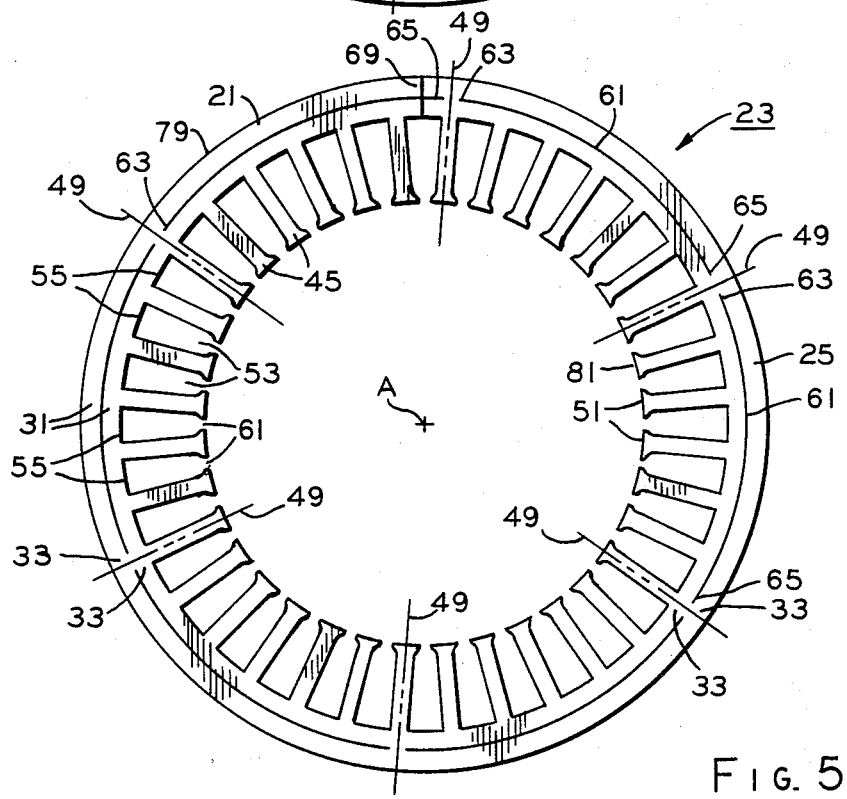
FIG. 5 is an end elevational view similar to FIG. 4 but showing the edgewise wound core in one form of the invention with the teeth, slots and yoke section of the edgewise wound core aligned generally in a plurality of row formations thereacross, respectively.

As previously mentioned, helical convolutions 67 of strip 21 are formed upon the edgewise deformation of the strip, and the helical convolutions are progressively accumulated into annular stack 73 until a preselected stack height H is attained therefor at which time the strip is severed, and leading and trailing end portions 69, 71 of the strip define a pair of generally opposite end faces 75, 77 on the annular stack of the helical convolutions of the strip, respectively, as best seen in FIG. 6. During the accumulation of helical convolutions 67 into annular stack 73 thereof, yoke section 25 of edgewise deformed strip 21 is disposed generally circumferentially about the annular stack, and outer edge 37 of such strip is arranged to form a generally circumferential surface 79 which extends about the yoke section across the annular stack between opposite end faces 75, 77 thereof, respectively. Of course, when helical convolutions 67 are being accumulated as discussed above, the component parts of edgewise deformed strip 21 defining such helical convolutions are generally angularly displaced from each other, as best seen in FIG. 4. However, helical convolutions 67 of edgewise deformed strip 21 in annular stack 73 thereof are easily or readily adjustable so as to be repositioned with respect to each other, and upon such adjustment or repositioning, the above discussed component parts of the edgewise deformed strip are disposed or otherwise aligned genrally in a plurality of row formations genrally axially across the annular stack between opposite end faces 75, 77 thereby to define core 23, as best seen in FIG. 5. It is contemplated that the component parts of edgewise deformed strip 21 in the helical convolutions 67 thereof may be aligned in the row formations thereof across annular stack 73 either during the accumulation of the helical convolutions into the annular stack or after the formation of the annular stack within the scope of the invention so as to meet at least some of the objects thereof. Albeit not shown for brevity of disclosure, teeth 45 on edgewise deformed strip 21 in helical convolution stack 73 may be associated in aligning relation with various different kinds of alignment fixtures or arbors or the like which are well known to the art thereby to effect the above discussed adjustment or repositioning of helical convolutions 67 in annular stack 73 thereof, respectively. If a more detailed discussion with respect to the accumulation of helical convolutions 67 into annular stack 73 thereof and/or the alignment of the annular stack is desired, reference may be had to the aforementioned Harold L. Fritzsche application Ser. No. 660,221.

With reference again to the drawings in general and recapitulating at least in part with respect to the foregoing, edgewise wound core 23 is illustrated in one form of the invention as being formed from lanced strip 21 edgewise and helically wound into annular stack 73 thereof defining the core (FIGS. 1–6). Yoke section 25 on wound lanced strip 21 extends generally circumferentially about core 23 and generally axially thereacross, and sets 27, 29 of generally edgewise deformed segments 31 are provided in the yoke section with the edgewise deformed segments in each segment set being disposed in a plurality of row formations thereof generally about the yoke section and axially across the core, respectively (FIGS. 1, 5, and 6).

More particularly and with specific reference to FIGS. 1, 5, and 6, when core 23 is formed or edgewise wound, yoke section 25 is edgewise deformed or wound lanced strip 21 extends generally circumferentially about the core between opposite end faces 75, 77 thereof, and outer edge 37 of such strip defines circumferential surface 79 about the yoke section between the opposite end faces of the core, respectively, as previously mentioned and as best seen in FIGS. 5 and 6. Further, segments 31, junctions 33, teeth 45, slots 53 and slits 61 are arranged generally in circumferentially spaced apart relation about annular stack 73 or core 23 so as to extend in a plurality of row formations thereof generally axially across the core between opposite end faces 75, 77 thereof, and tip sections 51 of the teeth define in part a bore 81 which extends generally axially through the core intersecting with the opposite end faces thereof, respectively. Of course, open ends 59 of slots 53 intersect with bore 81 of core 23, and yoke section 25 of the core between opposite end faces 75, 77 thereof is defined generally between circumferential surface 79 and inner edges 55 of closed ends 59 in slots 53 and adjacent root sections 47 of teeth 45, respectively.

Figure 7:
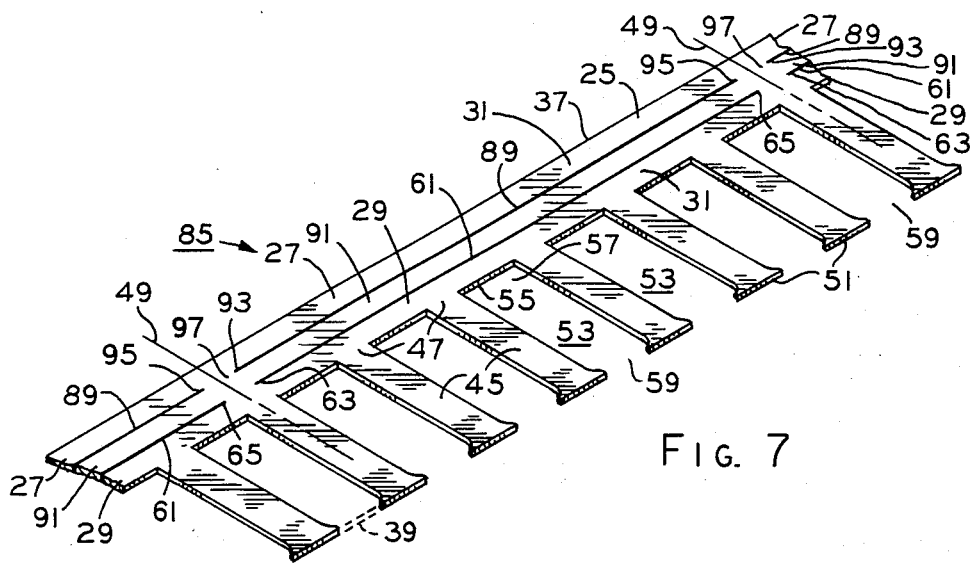
FIG. 7 is a partial plan view of an alternative lanced strip in one form of the invention.
Figure 8:
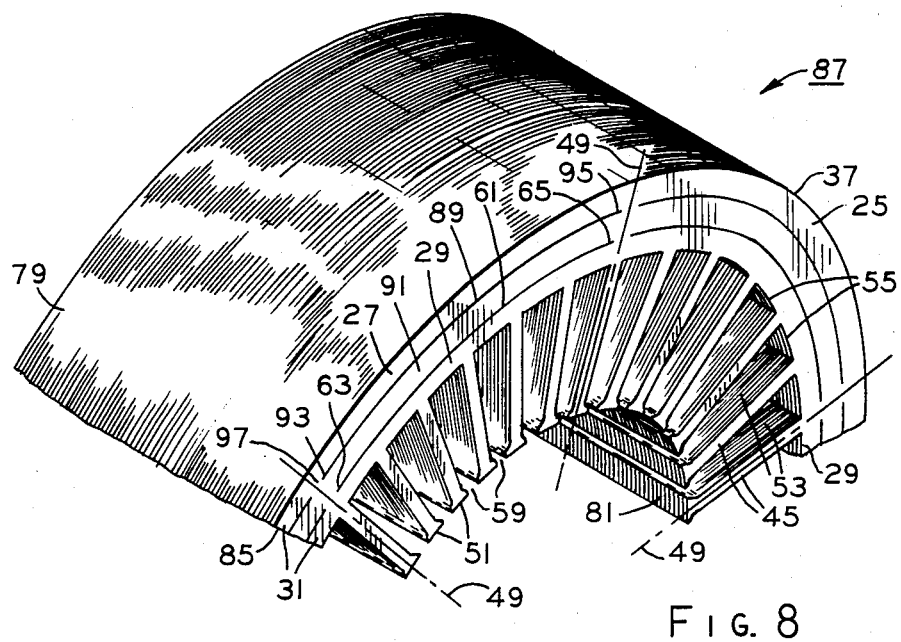
FIG. 8 is a partial perspective view of an alternative edgewise wound core in one form of the invention utilizing the lanced strip of FIG. 7.

An alternative lanced strip 85 and edgewise wound core 87 are illustrated in FIGS. 7 and 8 in one form of the invention, respectively, and such alternative strip and core have generally the same component parts and are edgewise wound generally in the same manner as discussed hereinabove with respect to strip 21 and core 23 with the exceptions noted hereinafter. While strip 85 and core 87 meet at least some of the objects set out hereinabove, it is believed that such strip and core may have indigenous objects and advantageous features which will be in part apparent and in part pointed out in the following discussion, respectively.

In strip 85, another plurality of slits 89 are lanced into and through yoke section 25 of the strip, and slits 89 have generally the same length or reaches along the length of the strip as slits 61 therein with slits 61, 89 being arranged in predetermined spaced apart relation across the yoke section between outer edge 37 and inner edges 55 of slots 53 and adjacent root sections 47 of teeth 45, respectively. Thus, it may be noted that slits 61, 89 define a plurality of sets 27, 29, 91 of segments 31 in yoke section 25 of strip 85 extending generally lengthwise thereof. Each slit 89 includes a pair of opposite ends or end portions 93, 95 defining the length or reach thereof, and a plurality of junctures 97 are integrally provided in segment set 91 between adjacent segments 31 therein with junctures 97 being integrally joined with adjacent junctures 33 in segment sets 27, 29 at the adjacent opposed ends of opposite ends 63, 65 of slits 61 and at the adjacent opposed ends of opposite end 93, 95 of slots 89, respectively. Of course, strip 85 maybe edgewise wound into core 87 in the same manner as previously discussed with regard to strip 21 and core 23, and segments 31 in segment sets 27, 29, 91 are edgewise deformed independently of each other and supported by junctures 33, 97 during such edgewise deformation, respectively.

Figures 9, 10:
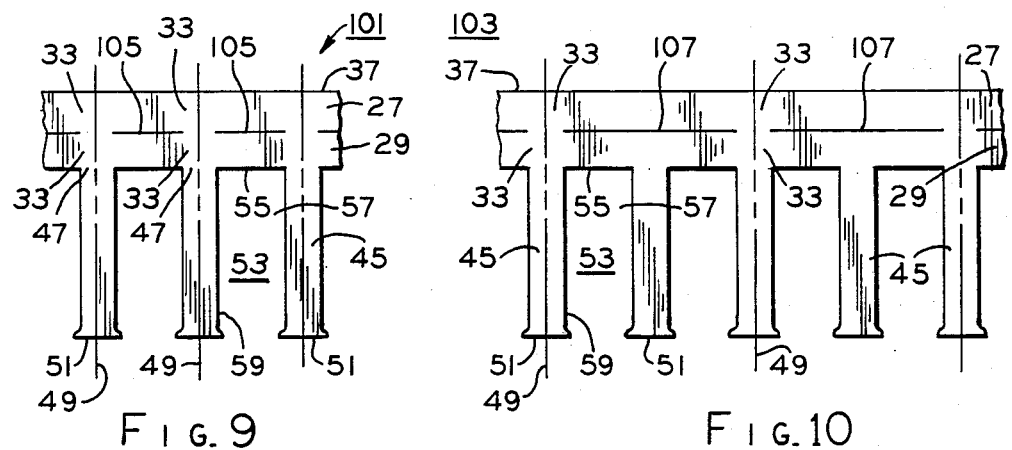
FIGS. 9-11 are partial plan views of other alternative lanced strips in one form of the invention, respectively.

While slits 61 as well as slits 89 are illustrated herein for purposes of disclosure as spanning across six adjacent slots 53 and between seven adjacent teeth 45, it is contemplated that other slits having different lengths and/or configurations so as to span across a preselected number of slots and a preselected number of teeth, as may be practical or desirable, may be utilized within the scope of the invention so as to meet at least some of the objects thereof. For instance, in FIGS. 9 and 10, alternative strips or lanced strips 101, 103 are illustrated in one form of the invention, respectively, each having the same component parts as the previously discussed strip 21 except for the lengths of slits 105, 107 thereon, respectively. As shown in FIG. 9, slits 105 extend across only one slot 53 between two adjacent teeth 45, and in FIG. 10, slits 107 extend across two adjacent slots between three adjacent teeth, respectively. Of course, strips 101, 103 may be edgewise deformed and wound into cores 23 in the same manner as previously discussed with respect to strip 21, respectively.

Figure 11:
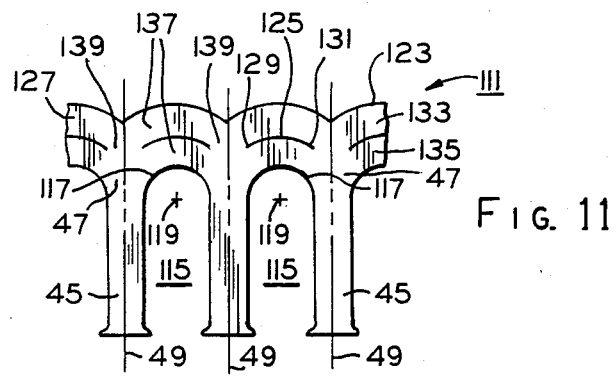
Figure 12:
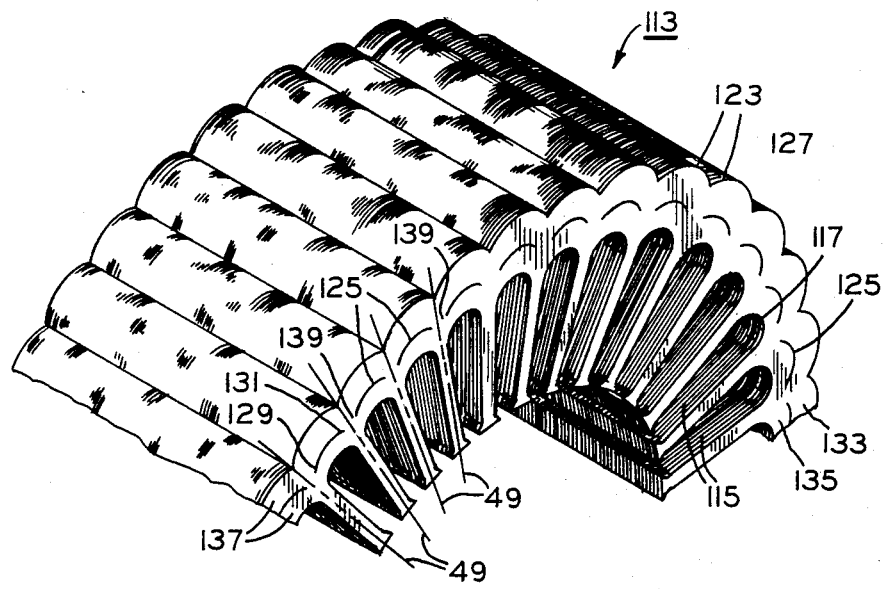
FIG. 12 is a partial perspective view of another alternative edgewise wound core in one form of the invention utilizing the lanced strip of FIG. 11.

In FIGS. 11 and 12, another alternative strip or lanced strip 111 and edgewise wound core 113 are illustrated in one form of the invention, respectively, having generally the same component parts arranged generally in the same manner as those previously discussed with respect to strip 21 and core 23 with the exceptions noted hereinafter. While strip 111 and core 113 meet at least some of the objects set out hereinbefore, it is believed that such strip and core may have indigenous objects and advantageous features as will be in part apparent and in part printed out hereinafter, respectively.

In strip 111, a plurality of generally round bottom slots 115 are formed therein between adjacent ones of teeth 45, and inner edges 117 of such slots are generally arcuate being formed on a radius about a centerpoint 119 so as to join between root sections 47 of adjacent teeth 45. Outer edge 121 of strip 111 is provided with a plurality of scallops or arcuate portions 123 therein which are formed on a radius generally about the same centerpoint 119 as inner edge 117, and a plurality of generally arcuate slits 125 are provided in a yoke section 127 of strip 111 with such slits also being formed on a radius about such same centerpoint. Thus, it may be noted that inner edges 117, outer edges 121 and slits 125 on yoke section 127 of strip 111 all have generally the same configuration being formed on different radii about centerpoint 117. Of course, slits 125 extend across only one slot 115, and opposite ends 129, 131 of such slits are arranged so that adjacent opposed ones thereof are predeterminately spaced from pitch axes 49 of adjacent ones of teeth 45. Arcuate portions 123 of outer edge 121 intersect on pitch axes 49 of teeth 45, respectively. Thus, arcuate slits 125 define a pair of sets 133, 135 of generally arcuate segments 137 in yoke section 127 of strip 111 extending along the length thereof with the slits being interposed between adjacent segments in the segment sets, and a plurality of junctures 139 are integrally interconnected between adjacent segments in the same segment set with such junctures being integraly interconnected with each other generally at or between the adjacent opposed ones of the opposite ends 129, 131 of the slits, respectively. Of course, strip 111 may be edgewise deformed and wound into core 113 in the same manner as previously discussed herein with respect to strip 21 and core 23, and upon such edgewise winding of strip 111, segments 137 are edgewise and independently deformed being supported by junctures 139 in yoke section 127, as previously discussed. Further, it may be noted that circumferential surface 79 of core 113 assumes the scalloped configuration of outer edge 121 of strip 111 with its arcuate portions 123 extending in a plurality of row formations thereof across the core, respectively.

Still another alternative strip or lanced strip 145 is shown in FIGS. 13 and 14 in one form of the invention, and such alternative strip has generally the same component parts and is edgewise wound generally in the same manner as discussed hereinabove with respect to strip 21 into core 23 with the exceptions noted hereinafter. While strip 145 meets at least some of the objects set out hereinabove, it is believed that such strip may have indigenous objects and advantageous features which will be in part apparent and in part pointed out in the following discussion.

During the formation or lancing of strip 145 from strip stock 35 in the same manner as previously discussed with respect to strip 21, segments 31 in segment set 27 are deformed or bent so as to be at least in part offset fromt he plane of yoke section 25 beyond opposite face 41 of the strip, and thereby the length or reach of such offset segments along slits 61 is increased between junctures 33 of the strip in the same segment set with such offset segments, respectively. Thus, upon the definition of segments 31 in sets 27, 29 thereof in strip 145, the segments 31 in segment set 27 are offset at least in part beyond opposite face 41 of the strip while the segments in segment set 29 remain generally in the plane of the strip between opposite faces 41, 43 thereof, respectively.

Of course, strip 145 may be edgewise deformed and wound into core 23 generally in accordance with the method previously discussed in detail hereinabove with respect to strip 21; however, during such edgewise deformation, a force F is exerted against offset segments 31 in segment set 27 thereby to reposition such offset segments generally in coplanar relation with opposite faces of the strip, respectively. Thus, it may be noted that the increase in length imparted to offset segments 31 during the definition thereof in strip 145 are absorbed by junctures 33 in segment set 27 supporting the offset segments; however, it may be further noted that such increase in the length of the offset segments is also effective to alleviate the stresses established upon the edgewise deformation of the offset segments and transferred to the junctures in segment set 27. Since the edgewise deformation of segment set 27 is, of course, greater than that of segment set 27, it is believed that the stretching or offsetting of offset segments 31 to increase the lengths thereof not only enhance the ability of the offset segments to be edgewise deformed but also enhances junctures 33 in segment 27 to resist rupture in response to the stresses imparted thereto upon the edgewise deformation of segments 31 independently of each other with strip 145. While offset segments 31 have been discussed hereinabove as being repositioned into generally coplanar relation with segments 31 in segment set 29 between opposite faces 41, 43 of strip 145 upon the edgewise deformation or winding thereof, it is contemplated that such force may be exerted by spaced apart plates or the like for instance through which the strip is moved during its edgewise deformation; however, discussion of such plates is omitted for purposes of brevity of disclosure and drawing simplicity.

From the foregoing, it is now apparent that novel lanced strips 21, 85, 101, 103, 111, 145 and novel edgewise wound cores 23, 87, 113 have been presented meeting the objects set forth hereinabove, as well as others, and it is contemplated that changes as to the precise arrangements, shapes, connections and details of the constructions illustrated herein by way of example for purposes of disclosure may be made by those having ordinary skill in the art without departing from either the spirit of the invention or the scope thereof as defined by the claims which follow.

What I claim as new and desire to secure by Letters Patent of the United States is:

1. An edgewise wound core for a dynamoelectric machine comprising:

a lanced strip of generally thin ferromagnetic material having a pair of opposite edges and with said strip being edgewise and helically wound into a generally annular stack thereof to define the core;

a pair of opposite end faces on said annular stack of said wound lanced strip defining the axial extent of the core, respectively;

a yoke section on said wound lanced strip adjacent one of said opposite edges thereof, said yoke section extending between said opposite end faces with said one opposite edge defining a circumferential surface about said yoke section between said opposite end portions respectively;

a plurality of teeth on said wound lanced strip extending on a plurality of preselected pitch axes therefor generally radially inwardly from said yoke section and arranged in a plurality of generally axial row formations between said opposite end faces, and said teeth including a plurality of tips terminating at least adjacent the other of said opposite edges of said wound lanced strip and defining in part a generally axial bore between said opposite end faces, respectively;

a plurality of winding receiving slots in said wound lanced strip generally between said teeth thereof and intersecting said other opposite edge thereof generally between said tips of adjacent ones of said teeth with said slots being arranged in a plurality of generally axial row formations between said opposite end portions, respectively;

a plurality of slits in said yoke section of said wound lanced strip extending in predetermined spaced apart relation with at least said one opposite edge thereof and spanning at least in part a preselected number of said slots between a preselected number of said teeth, said slits being arranged in a plurality of generally axial row formations between said opposite end faces and said slits each including a pair of opposite ends, respectively;

a plurality of sets of generally edgewise deformed separate segments defined in said yoke section of said wound lanced strip by said slits and extending generally between said opposite ends thereof, said segments of each segment set being arranged in a plurality of generally axial row formations about said yoke section and between said opposite end faces, respectively; and a plurality of junctions in said yoke section of said wound lanced strip, each of said junctions spanning across a preselected one of the preselected pitch axes of said teeth so as to be integrally interposed between adjacent segments of each segment set and each of said junctions being integrally interconnected with an adjacent one thereof generally at adjacent opposed ones of said opposite ends of said slits, respectively.

2. An edgewise wound core for a dynamoelectric machine comprising:

a lanced strip of generally thin ferromagnetic material edgewise and helically wound into a generally annular stack thereof defining the core;

a yoke section on said wound lanced strip and extending generally circumferentially about the core and generally axially theracross; and a plurality of sets of generally edgewise deformed separate segments in said yoke section of said wound lanced strip with said segments of said segment sets being disposed in a plurality of row formations thereof generally about said yoke section and axially across the core, respectively.

3. An edgewise wound core as set forth in claim 2 further comprising a plurality of junctions in said yoke section of said wound lanced strip integrally interposed between adjacent segments in each segment set and each of said junctions being integrally interconnected with an adjacent one thereof, respectively.

4. An edgewise wound core as set forth in claim 2 further comprising a plurality of slits in said yoke section of said wound lanced strip and disposed between said segments in adjacent segment sets, respectively.

5. An edgewise wound core as set forth in claim 2 further comprising a plurality of teeth on said wound lanced strip extending on a plurality of preselected pitch axes from said yoke section generally radially inwardly thereof and in a plurality of row formations across the core, and said segments spanning between a preselected number of said teeth, respectively.

6. An edgewise wound core as set forth in claim 2 further comprising a plurality of means on said wound lanced strip extending from said yoke section thereof for defining a plurality of winding receiving slots and with said extending means and said slots being arranged generally in a plurality of row formations thereof across the core, and said segments spanning a preselected number of said slots, respectively.

7. An edgewise wound core as set forth in claim 3 further comprising a plurality of teeth on said wound lanced strip extending on a plurality of preselected pitch axes from said yoke section generally radially inwardly therefrom and in a plurality of row formations across the core, and said junctions spanning across preselected ones of the preselected pitch axes of said teeth, respectively.

8. An edgewise wound core for a dynamoelectric machine comprising:
- a lanced strip of generally thin ferromagnetic material edgewise and helically wound into a generally annular stack thereof defining the core;
- a pair of opposite end faces on said annular stack of said wound lanced strip defining the axial extent of the core, respectively;
- a yoke section on said wound lanced strip and extending generally circumferentially about said annular stack of said wound lanced strip between said opposite end faces, respectively; and
- at least two sets of deformed segments in said yoke section of said wound lanced strip with each deformed segment being aligned with others of the deformed segments in each set in a plurality of row formations thereof spaced generally about said yoke section and extending between said opposite end faces, respectively.

9. An edgewise wound core as set forth in claim 8 further comprising at least one set of means in said yoke section of said wound lanced strip for separating said deformed segments of said at least two sets, respectively.

10. An edgewise wound core as set forth in claim 9 wherein said separating means comprise at least one set of spaced slits.

11. An edgewise wound core as set forth in claim 9 further comprising a plurality of means associated with said yoke section of said wound lanced strip for defining a plurality of winding receiving slots extending in a plurality of row formations thereof adjacent said yoke section and between said opposite end faces, and said separating means spanning a preselected number of said winding receiving slots, respectively.

12. An edgewise wound core as set forth in claim 8 further comprising a plurality of means for integrally interconnecting adjacent segments in said each set and with each of said integrally interconnecting means in said each set being integrally interconnected with an adjacent integrally interconnecting means in another of said at least two sets, respectively.

13. An edgewise wound core for a dynamoelectric machine comprising:
- a lanced strip of generally thin ferromagnetic material having a pair of opposite edges and with said strip being edgewise and helically wound into a generally annular stack thereof defining the core;
- a yoke section on said wound lanced strip at least adjacent one of said opposite edges thereof with said yoke section extending across the core and with said one opposite edge defining a circumferential surface about said yoke section;
- a plurality of means on said wound lanced strip extending from said yoke section for defining a plurality of winding means receiving slots and with said slots being arranged in a plurality of row formations thereof about said yoke section and across the core, respectively; and
- a plurality of slits in said yoke section of said wound lanced strip spanning a preselected number of said winding receiving slot and arranged to extend in a plurality of row formations thereof about said yoke section and across the core, respectively.

14. An edgewise wound core as set forth in claim 13 wherein said winding receiving slots include a plurality of spaced apart open end portions intersecting with the other of said opposite edge of said wound lanced strip, and a plurality of closed end portions generally opposite said open end portions, and each of said closed end portions defining another edge on said wound lanced strip having at least generally the same configuration as said slits and arranged in spaced apart opposite facing relation with said one opposite edge of said wound lanced strip, respectively.

15. An edgewise wound core as set forth in claim 13 further comprising a plurality of sets of generally edgewise deformed segments defined in said yoke section of said wound lanced strip at least in part by said slits with each edgewise deformed segment being arranged generally in alignment with others of said edgewise deformed segments in each segment set in a plurality of row formations spaced generally about said yoke section and extending across the core, respectively.

16. An edgewise wound core as set forth in claim 15 further comprising a plurality of means for integrally interconnecting adjacent edgewise deformed segments in the said each segment set and with each of said integrally interconnecting means being integrally interconnected with an adjacent integrally interconnecting means, respectively.

17. An edgewise wound core for a dynamoelectric machine comprising:
- a lanced strip of generally thin ferromagnetic material edgewise and helically wound into a generally annular stack thereof defining the core; and
- a plurality of sets of generally edgewise deformed segments in said wound lanced strip with said edgewise deformed segments in each segment set extending generally in a plurality of row formations thereof across the core, each of said edgewise deformed segments being free of an adjacent edgewise deformed segment in an adjacent segment set at each of a plurality of reaches of said edgewise deformed segments along said wound lanced strip and said each edgewise deformed segment being joined to said adjacent edgewise deformed segment in said adjacent segment set at a plurality of junctures generally between said reaches, respectively.

18. A lanced strip of generally thin ferromagnetic material adapted to be edgewise and helically wound into a core for a dynamoelectric machine comprising:
- a pair of opposite edges on the lanced strip extending generally lengthwise thereof, respectively;
- a yoke section on the lanced strip extending generally lengthwise thereof at least adjacent one of said opposite edges;
- a plurality of teeth arranged about a plurality of preselected pitch axes therefor and extending generally laterally from said yoke section toward the other of said opposite edges of the lanced strip, said teeth including a plurality of tip sections at least adjacent said other opposite edge, and a plurality of root sections generally opposite said tip sections and integral with said yoke section, respectively;
- a plurality of slots in the lanced strip generally between adjacent ones of said teeth and including a plurality of open end portions intersecting said other opposite edge of the lanced strip generally between adjacent ones of said tip sections of said teeth, a plurality of closed end portions generally opposite said open end portions, and a plurality of slot edges in said closed end portions having at least generally the same configuration as said one opposite edge of the lanced strip and arranged in opposite facing relation therewith and with said slot edges extending at least in part between adjacent ones of said root sections of said teeth at least adjacent said yoke section, respectively;

a plurality of sets of separate segments in said yoke section of said lanced strip extending generally lenthwise thereof and generally between said one opposite edge and said slot edges, respectively;

at least one set of spaced apart slits in said yoke section of the lanced strip interposed between adjacent ones of said segments in adjacent ones of said segment sets with said slits spanning generally across a preselected number of said slots and between a preselected number of said teeth, and said slits including a pair of opposite ends generally defining the length of said segments and with adjacent opposed ones of said opposite ends being predeterminately arranged in spaced apart relation from preselected ones of the pitch axes of said teeth, respectively; and a plurality of sets of junctions in said yoke section of the lanced strip integrally interconnected between adjacent ones of said segments in each of said segment sets and with each junction in said each segment set being integrally interconnected with an adjacent junction in said adjacent one of said segment sets generally at said adjacent opposed ones of said opposite ends of said slits, respectively.

19. A lanced strip of generally thin ferromagnetic material adapted to be edgewise and helically wound into a core for a dynamoelectric machine comprising:
a yoke section extending generally lengthwise of the lanced strip;
a plurality of sets of separate segments in said yoke section extendign generally lengthwise of the lanced strip, respectively; and
a plurality of junction means in said yoke section for integral interconnection between adjacent segments in each segment set and with each of said junction means in said each segment set being integrally interconnected with an adjacent junction means in another of said segment sets adjacent said each segment set, respectively.

20. A lanced strip as set forth in claim 19 further comprising a plurality of means in said yoke section for separating said segments in adjacent segment sets, respectively.

21. A lanced strip as set forth in claim 19 further comprising a plurality of teeth extending about a plurality of preselected pitch axes therefor and generally laterally from said yoke section, said junction means spanning across preselected ones of the preselected pitch axes respectively.

22. A lanced strip as set forth in claim 19 further comprising a plurality of slots in said lanced strip at least adjacent said yoke section and predeterminately spaced apart generally lengthwise of said lanced strip, said segments spanning generally across a preselected number of said slots, respectively.

23. A lanced strip of generally thin ferromagnetic material adapted to be edgewise wound into a core for a dynamoelectric machine comprising:

a yoke section on said lanced strip extending generally lenthwise thereof;
a plurality of teeth on said lanced strip disposed about a plurality of preselected pitch axes and extending generally laterally from said yoke section, respectively; and
a plurality of slits in said yoke section extending generally lengthwise thereof and spanning between a preselected number of said teeth, respectively.

24. A lanced strip as set forth in claim 23 wherein said slits include a pair of opposite ends with adjacent opposed ones of said opposite ends being arranged in predetermined spaced apart relation from preselected ones of the preselected pitch axes of said teeth, respectively.

25. A lanced strip as set forth in claim 23 further comprising a plurality of slots in said lanced strip between adjacent ones of the teeth, and said slits spanning generally across a preselected number of said slots, respectively.

26. A lanced strip as set forth in claim 25 wherein said slots include a plurality of slot edges extending at least in part between said adjacent ones of said teeth and defining in part said yoke section, said slot edges and said slits having at least generally the same configuration and being predeterminately spaced apart, respectively.

27. A lanced strip as set forth in claim 23 further comprising a plurality of sets of segments in said yoke section with adjacent segments in the each segment set being spaced apart generally lengthwise of the lanced strip and with adjacent segments in adjacent segment sets being separated by said slits, respectively.

28. A lanced strip as set forth in claim 27 further comprising a plurality of junction means spanning across preselected ones of the preselected pitch axes of said teeth for integral interconnection between said adjacent segments in said segment sets and with each junction means in said segment sets being integrally interconnected with another of said junction means in at least one of said adjacent segment sets generally between said slits, respectively.

29. A lanced strip of generally thin ferromagnetic material adpated to be edgewise and helically wound into a core for a dynamoelectric machine comprising:
a yoke section on the lanced strip extending generally lengthwise thereof and including a plurality of sets of segments with adjacent segments in the each segment set extending generally lengthwise of the lanced strip, each of said segments being free of an adjacent segment in an adjacent segment set at each of a plurality of reaches of said segments along the length of the lanced strip and said each segment being joined to said adjacent segment in said adjacent segment set at a plurality of junctures between said reaches, respectively.

30. A lanced strip of generally thin ferromagnetic material adapted to be edgewise wound into a core for a dynamoelectric machine comprising:
a pair of opposite faces on the lanced strip;
a plurality of sets of segments extending generally lengthwise of the lanced strip between said opposite faces thereof with said segments in at least one of said segment sets being at least in part offset from the lanced strip beyond one of said opposite faces thereof, respectively; and
a plurality of junction means in the lanced strip for integral interconnection between adjacent segments in each of said segment sets and with each of said junction means in said each segment set being integrally interconnected with an adjacent junction means in another of said segment sets, respectively.

* * * * *